Patented Feb. 16, 1954

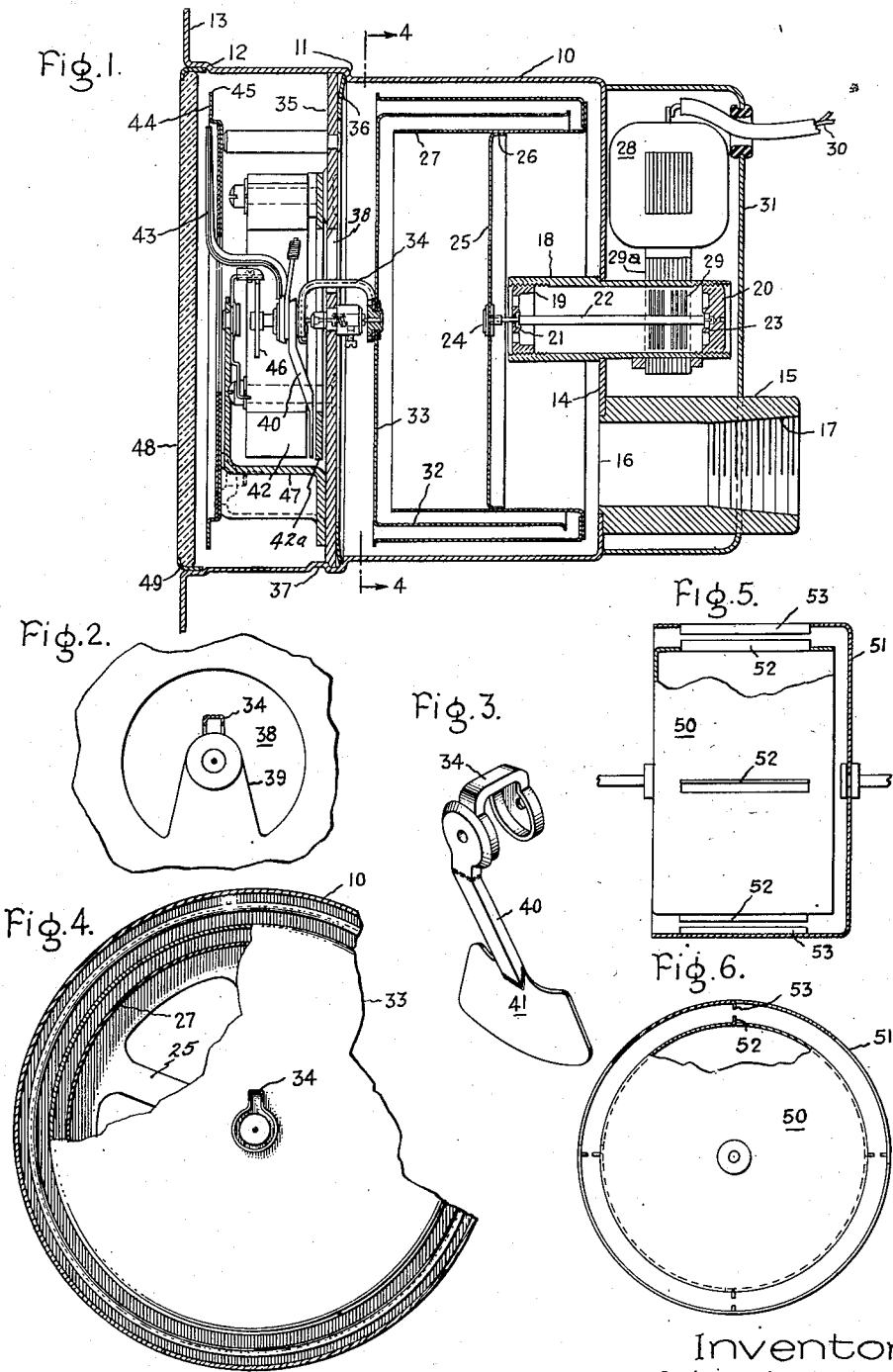

2,669,124

UNITED STATES PATENT OFFICE 2,669,124

VACUUM GAUGE

John A. Roberts, Lynn, Mass., assignor to General Electric Company, a corporation of New York Application February 25, 1948, Serial No. 10,747

12 Claims. (Cl. 73—388)

This invention relates to an improved vacuum gage for the measurement of gas pressures in a vacuum system and more particularly to improvements in the Langmuir-Dushman molecular gage described, for example, in an article, "Theory and use of the molecular gauge," by Dushman, Physical Review, volume 5, (2nd Series), No. 3 (March 1915), pages 212–229.

The molecular gage operates on the principle that the tangential force transmitted through a gas between parallel surfaces of two relatively rotatable coaxial members varies as a function of the gas pressure when the spacing between such members is substantially equal to or less than the mean free path of the gas molecules at the pressures measured. Although having certain advantages over the other types of vacuum gages, previous molecular gages have serious disadvantages which restrict their value as a pressure gage for ordinary commercial use. Among these disadvantages is the effect of eddy currents generated by the magnetic field of the motor, and the tendency of the relatively rotated members to oscillate and to swing out of accurate coaxial alignment due to the lack of damping resistance at the low pressures measured. An object of the present invention is to overcome these disadvantages.

Another object is to provide an improved vacuum gage, having an accuracy equal to that of expensive laboratory instruments, which can be manufactured at a relatively low cost.

Another object is to provide a rugged and reliable vacuum gage, having compact construction, suitable for panel mounting in a manner favored in commercial installations.

In a preferred embodiment of the present invention there is provided a compact unitary structure comprising a vacuum-tight case with means supporting therein in coaxial nested relation a pair of independently rotatable hollow cylindrical members, the first of which is rotated at a constant speed by a synchronous motor and the second of which is arranged to move freely within the first member. The second member is coupled to an indicating device and is resiliently biased to a reference angular position by a spring member. The motion of the first member causes a transfer of force to the second rotatable member which is a function of the pressure of the gas present and consequently the latter develops a torque which is indicated on an indicating device in terms of pressure.

Other and further objects and advantages of the present invention will become apparent, and the foregoing will be understood in relation to the following exemplifications thereof, reference being had to the drawings in which Fig. 1 is a section view in side elevation of a preferred embodiment of the present invention; Fig. 2 is a fragmentary view of a supporting member utilized in the device illustrated in Fig. 1; Fig. 3 is a perspective showing a part of the instrument damping means of Fig. 1; Fig. 4 is a section taken along lines 4—4 of Fig. 1; Fig. 5 is a section in side elevation illustrating a modification of two members of the preferred embodiment; and Fig. 6 is a front elevation partly in section of the modification shown in Fig. 5.

Referring now more particularly to Fig. 1, there is illustrated a case or vessel 10 which functions to support therein the main components of the device. The case 10 is preferably constructed in the form of a cylindrical container composed of metal, preferably steel. In practice, this case may be pressed out, from a single piece of material in the above desired form with annular shoulders formed at points 11 and 12 and having the open end thereof upset outwardly to form a flange 13. The flange 13 permits the entire unit to be secured to a panel while the shoulders 11 and 12 provide the necessary means for supporting, in proper position, certain of the elements, within the case 10 as will be described below.

Means for coupling the present device to a vacuum system (not shown) is provided by a tubular member 15, one open end of which is hermetically sealed to an aperture 16 in the bottom portion 14 of the case 10. The other end 17 of the member 15 is threaded on the inside thereof a sufficient distance to provide the necessary means for attachment to the vacuum system.

Means for supporting a rotatable member to be presently described is provided in the following manner. A tubular member 18 is arranged to extend partly inside and partly outside of the case 10 and is hermetically sealed thereto in the center of the bottom portion or end 14 of the case and in axial alignment therewith. The tubular member 18 is constructed of a non-magnetic metal such as copper, aluminum, brass or the like. The distance the tubular member 18 extends within the case 10 will depend on the disposition of other components within the case. Both ends of the tubular member 18 are threaded so as to enable the engagement within said ends of a pair of bearing mounts 19 and 20, the mount 20 being hermetically sealed to the outer end of the tubular member to keep the case vacuum tight. The mount 19 provides for the support, for example, of a ring-type jewel bearing 21. Other forms of bearings such as ball bearings may be used. The bearing 21 is adapted to permit the passage therethrough of a shaft 22. The other end of the shaft is journalled in a second ring-type bearing 23 supported by the mount 20. That portion of the shaft 22 extending through the bearing 21 is provided with a hub or boss 24. In the present embodiment the shaft is knurled and the hub is pressed on after assembly of the shaft in the bearing.

A spoked disk 25 is attached, at the center thereof, to the boss 24 by cementing and staking or other suitable means. The edge 26 of the disk is upset at right angles to the main plane surface of said disk. To this edge 26 is fastened a member 27 which preferably has the form of inner and outer hollow cylinders, arranged coaxially one within the other, as shown. The cylindrical member 27 is attached to the spoked disk 25 at a point which will provide a satisfactory dynamic balance when said cylindrical member is rotated at high speed. Preferably, the cylindrical member 27 is composed of aluminum having a thickness of the order of four thousandths (.004) of an inch. This thickness is not critical but should be sufficient to withstand the stresses induced at the high velocity of rotation imparted to this member. While the fabrication of member 27 is illustrated as comprising two parts, this member can be made from a single piece of the desired material to form the desired configuration above described.

Member 27 is rotated by a self-starting synchronous motor 28, the rotor 29 of which is fastened to that part of the shaft 22 adjacent to the mount 20 within that portion of tubular member 18 which is outside of case 10. As shown, the rotor 29 is disposed within the tubular member 18 and a stator 29a cooperating therewith is arranged to substantially surround the tubular member 18 around that portion adjacent the rotor. A pair of conductors 30 provide the means for conducting alternating current to the motor 28. Preferably, the synchronous motor above described is operated at a constant speed of 3600 revolutions per minute. Although this is the preferred speed, there will be pointed out further along reasons why this speed may sometimes have a different rate.

The motor 28 is housed in a dustproof cover 31 suitably attached to the main case 10 and provided with suitable apertures to accommodate the member 17 and conductors 30. The cover, which is preferably of ferromagnetic metal such as steel, cooperates with steel case 10 to enclose the magnetic field of the motor and thus serves to shield the other parts of the apparatus from any stray electrical effects produced by the motor 28 which might produce disturbing eddy currents.

Coacting with the cylindrical member 27, and in coaxial nested relation therewith, is an intermediate cylindrical member 32 having a bottom or end portion 33. This last-mentioned member may be made of the same material as the member 27 and is preferably of the order of .002 inch in thickness. It is important to keep the weight of the member 32 to a minimum since one of the fundamental problems involved in producing a satisfactory instrument is that of obtaining a sufficiently high ratio of moving system torque to moving system weight.

The cylindrical side wall of the member 32 is adapted to slip in between the walls of the member 27 (set Fig. 4). The spacing between the coacting walls of the members 27 and 32, that is, the spacing between the inner cylinder of member 27 and the intermediate cylinder, member 32, and also the spacing between the intermediate cylinder and the outer cylinder of member 27, is preferably a distance less than or of the same magnitude as the mean free path of the gas molecules present in the vacuum system under observation. In this particular embodiment, the preferred pressure range is from zero to twenty microns and the mean free path at the latter pressure is approximately 3.5 mm. Therefore, the spacing between major portions of members 27 and 32 is maintained at approximately ⅛ inch (3 mm.).

Means for rotatably supporting and maintaining the member 32 aligned in accurate coaxial nested relation with the member 27 is provided as follows. Attached to the bottom portion 33 is a substantially C shaped yoke 34 (see Fig. 3). The yoke is attached to the center of the portion 33 and is rotatably supported by a disk 35. The disk 35 is disposed transversely within the case 10 and supported against the annular shoulder 11 provided for it. To secure the disk against movement, a spring washer 36 is disposed on one side of said disk and is arranged to urge the disk in tight contact with a plurality of indents 37, only one of which appears in the drawing. The disk 35 is so constructed as to provide an aperture 38 (see Fig. 2) from the circumference of which there extends, radially inward, a substantially triangular member 39. The apex of the member 39 serves as a bearing support for a pair of instrument-type bearing recesses which face in opposite directions along the common axis of the cylindrical members 27 and 32, as shown in the drawing. These bearing recesses rotatably support pivots attached to the tines of yoke 34. The aperture 38 is so arranged as to permit the movement of the yoke 34 through an arc of substantially 300 degrees.

Instrument damping means are provided which are integral with the yoke 34, as illustrated in Fig. 3, by a vane 40 composed of aluminum or other electrically conductive material. Since no air damping is possible due to the vacuum in which the elements of this device move, magnetic means are provided to accomplish such damping. The free end 41 of the vane extends into and intercepts the magnetic field in the air gap between a permanent magnet 42 and a magnetic member 42a, both of which are secured to the disk 35, so that any rotation of member 32 moves vane 41 transversely through the magnetic field between magnet 42 and member 42a, thereby providing damping resistance to such rotation.

Means for indicating the amount of pressure in the vacuum system is provided by a pointer 43 coacting with a scale 44. The pointer is attached to or made integral with the yoke 34. The scale 44 is secured to the disk 35 and is disklike in configuration, and edge 45 thereof has inscribed thereon the desired numerical indications of pressure (not shown). As arranged the pointer 43 is in the same plane as the indicia inscribed on the edge 45.

Since the measure of the gas pressure in the vacuum system is a function of the torque developed by the cylindrical member 32, a spirally-wound spring 46 is provided to bias the member 32 resiliently to a reference angular position representing zero pressure. The inner end of the spring 46 is suitably fastened to the support of the pointer 43 while the outer end of the spring is secured to a bracket 47, the bracket in turn being secured to the disk 35.

Attention is called to the fact that all of those components cooperating with the indicating means, including the cylindrical member 32, are directly or indirectly secured to the disk 35. This arrangement enables the assembly of these components outside of the case 10 and thus permits a greater economy in the construction of such a device.

In order to provide an air tight fit at the indicating end of the present device, a window 48 is hermetically sealed to an annular window bezel 49. This assembly is then placed in the annular shoulder-like recess 12 and hermetically sealed thereto. The hermetic sealing of the tubular members 15 and 18 to the case 10 and the proper sealing of the bearing mount 20 to the tubular member 18 together with the above sealing of the indicating end provide a complete unitary structure free of air leaks.

Having described the preferred embodiment of the present invention there will now be presented the theory and operation of the device.

The operation of the device of the present invention is based on the change of "viscosity" of a gas with respect to change in pressure under certain conditions. As here used, viscosity refers to the coefficient of force transmission between the walls of the cylindrical members 27 moving relative to the wall of the member 32 through the medium of the gas between them.

The major condition for linear variation of viscosity with pressure is that the distance between the members mentioned above be of the same order as, or less than, the mean free path of the gas molecules over the pressure range considered. The mean free path of a gas is the average distance a gas molecule travels before it collides with another gas molecule. In the particular embodiment above described, the preferred range of pressure is from zero to twenty microns. At a pressure of twenty microns the mean free path of air is 3.5 mm.

In accordance with the present invention the spacing between the walls of the cylinders 27 and 32 is of the order of three millimeters. If the mean free path of the molecules becomes less than the separation of these members, the viscosity variation is no longer linear with pressure, the change being less until finally as the mean free path becomes shorter (that is, pressure increases), there is no substantial variation in viscosity with changing pressure.

If the cylindrical member 27 is set in motion relative to the cylindrical member 32, and the above conditions are satisfied, there will be a force acting on the restrained member 32 depending upon the rate of motion of the moving member 27 and the pressure of the gas in which they are immersed. If the rate of motion of the moving member is constant and the other member allowed to deflect against the spring 46, the deflection will be a measure of the pressure of the gas in which both members are immersed.

The torque produced in the above-described device may be expressed by the following equation:

$$L = 4\pi r^3 l A P V \sqrt{\frac{M}{RT}} \quad (1)$$

where:

L = Torque.
r = Radius of stationary cylinder.
l = Length of restrained cylinder interleaved between the walls of the rotating cylinder.
A = A constant which has somewhat different values for different gases and surface conditions.
V = Angular velocity of rotating cylinder.
M = Molecular weight of gas.
R = The gas constant.
T = Absolute temperature.
P = Pressure.

The above equation may be simplified to a single constant K, which will include $r^3$, $l$ $$A\sqrt{\frac{1}{R}}$$

and $4\pi$, as follows:

$$L = KPV\sqrt{\frac{M}{T}} \quad (2)$$

From the above equations it appears that a straight line relationship should exist between torque and pressure. This is so when the mean free path is large compared to the spacing between the cylinders. As the mean free path approaches and becomes less than the spacing distance, the torque vs. pressure characteristic departs from linearity. It is difficult to attempt exact calculations of this departure from linearity.

The effects to be expected with changes in motor speed, temperature, and gas composition are indicated in Equation 2.

By decreasing the spacing between stationary and rotating parts and using a stronger spring 46 or a lower motor speed, a range of the order of 0–200 microns may be provided for in the present device. At 200 microns the free path of a gas is about ⅓ millimeter.

The illustrative embodiment first above described provides a minimum reliable pressure reading of the order of 0.1 micron. The operation of the device after the synchronous motor is energized is completely automatic, provides continuous indications, and has a faster response time than vacuum measuring devices utilizing, for example, thermocouples and resistance wire. Unlike some other devices of the prior art, the present invention will detect and indicate vapor pressures. Furthermore, the accidental application of abnormal pressure will not damage the device of the present invention.

In Figs. 5 and 6 there is illustrated a modification which provides for the measurement of pressures at which the mean free path becomes less than the practical operating clearances of the parts utilized in such a device.

Referring to Figs. 5 and 6, the modification of the cylindrical members described in the first embodiment consists of a pair of independently rotatable cylindrical members 50 and 51 arranged in coaxial nested relation in the same manner as hereinbefore described. Other parts of the instrument, not shown in Figs. 5 and 6, may be similar to corresponding parts of the embodiment shown in Fig. 1. Integral with the cylinders 50—51 are a plurality of louvres 52—53 disposed in equi-spaced and parallel relation to each other and the axis of said cylindrical members. Preferably these louvres are punched out of the walls of the cylinders 50—51, the punched out portions being upset to assume a position at right angles of the main body of the cylinders as illustrated. The louvres 53 extend inwardly with respect to the cylinder 51 while the louvres 52 extend outwardly with respect to the cylinder 50.

In this particular embodiment, the louvres 53 are the continuously rotatable members and the louvres 52 are rotatably mounted but resiliently biased to a substantially stationary condition when the device is not in operation. Magnetic damping of the cylindrical member 50 may be provided for in the same manner and arrangement as described in connection with the embodiment of Fig. 1.

It may be noted from the drawing that louvres 52 and 53 occupy relatively small portions of the surfaces of cylindrical members 50 and 51, respectively. The major or cylindrical portions of members 50 and 51 are preferably spaced apart by about one-eighth inch, as in the previously described embodiment. At pressures below about 20 microns, the mean free path of gas molecules is greater than the spacing between cylinders 50 and 51, and the apparatus operates as a molecular gage in the manner previously described. Within this pressure region, the action of louvres 52 and 53 is not important, and has little effect. However, above the pressure range where the spacing is greater than the free mean path between gas molecules, the louvred type of gauge can still be used to measure pressure by fluid or fan action. Thus, there is a transition from the change in viscosity theory of measurement to the fluid pressure theory of measurement with the form of the invention shown in Figs. 5 and 6 as the pressure increases from below to above about 20 microns.

The above described arrangement permits the use of direct molecular action at low pressures, and is also capable of measuring vacuum in the millimeter range of vacuum and upwards. It is readily adapted to measure pressures in both millimeter and micron ranges by varying the synchronous speed of the member 51 or by adjusting the tension exerted by the resilient biasing means on the member 50 to alter the restraining torque. This arrangement has the added advantage that the amount of pointer deflection in the micron and millimeter range of a given instrument could be proportioned by the relative area of the louvres 52—53 to the area of the cylindrical members 50—51 to provide the desired range of measurement.

The embodiments of the present invention which have been illustrated and described have been selected for the purpose of setting forth the principles involved. It will be obvious that the invention may be modified to meet varying conditions for different specific uses and it is, therefore, intended to cover by the appended claims all such modifications which fall within the true spirit and scope of the present invention.

What I claim as new and desire to secure by Letters Patent of the United States, is:

1. A vacuum gage for measuring the pressure in a vacuum system, comprising a vacuum-tight case having a supporting member positioned intermediate the ends thereof and an opening suitable for connection to a vacuum system, first and second rotatable members positioned within said case on one side of said supporting member in coaxial relation with each other, the spacing between major portions of said first and second members being not greater than about one-eighth inch, means to rotate said first rotatable member about the common axis of said first and second rotatable members, a yoke movably supported within an opening in said supporting member and attached to said second rotatable member, means supporting said yoke for rotation about the common axis of said first and second members, said last-named means including a pair of bearings mounted on said supporting member and coacting with the tines of said yoke, whereby said second rotatable member is maintained in accurate coaxial relation with said first rotatable member and is rotatable independently thereof, resilient means biasing said second rotatable member to a reference angular position, and indicating means connected to said second rotatable member for indicating angular displacements thereof from said reference position.

2. A vacuum gage for measuring the pressure in a vacuum system, comprising a vacuum-tight case having a partition positioned intermediate the ends thereof and an opening suitable for connection to a vacuum system, first and second hollow cylindrical members positioned within said case on one side of said partition in coaxial nested relation, the spacing between major portions of the sides of said cylindrical members being not greater than one-eighth inch, means to rotate said first member about the common axis of said cylindrical members, a relatively rugged yoke movably supported within an opening in said partition and attached to said second member, means supporting said yoke for rotation about the common axis of said cylindrical members, said last-named means including a pair of bearings mounted on said partition for rotatably supporting the tines of said yoke, whereby said second member is maintained in accurate coaxial nested relation with said first member and is rotatable independently thereof, resilient means biasing said second member to a reference angular position, and indicating means connected to said second member for indicating angular displacements thereof from said reference position.

3. A vacuum gage for measuring the pressure in a vacuum system, comprising a vacuum-tight case having a transverse partition positioned intermediate the ends thereof and an opening suitable for connection to a vacuum system, first and second hollow cylindrical members positioned within said case on one side of said transverse partition in coaxial nested relation, the spacing between major portions of the sides of said cylindrical members being not greater than the mean free path of gas molecules at the highest pressure to be measured, means to rotate said first member about the common axis of said cylindrical members, a pair of bearing recesses supported by said transverse partition facing in opposite directions along the common axis of said cylindrical members, a relatively rugged yoke movably supported within an opening in said partition and having tines with pivots thereon rotatably supported by said bearing recesses, said second cylindrical member being attached to and supported by said yoke so that said second member is maintained in accurate coaxial nested relation with said first member and is rotatable independently thereof, resilient spring means biasing said second member to a reference angular position, a scale attached to said case, and a pointer attached to said yoke and positioned in cooperative relation with said scale to indicate angular displacements of said second member from said reference position.

4. A vacuum gage for measuring the pressure in a vacuum system, comprising a vacuum-tight ferromagnetic metal case having an opening suitable for connection to a vacuum system, first and second hollow cylindrical members positioned within said case in coaxial nested relation, the spacing between major portions of the sides of said cylindrical members being about one-eighth inch, a shaft attached to said first cylindrical member and coaxial therewith, a nonmagnetic metal tube surrounding said shaft and extending through one end of said case, means closing the outer end of said tube to keep the case vacuum tight, bearings rotatably supporting said shaft within said tube, a magnetic rotor attached to said shaft within the portion of said tube outside the case, an electric motor stator about the outside of said tube adjacent to said rotor, whereby said stator, when energized, rotates said rotor, said shaft, and said first cylindrical member about the common axis of said cylindrical members, a ferromagnetic metal cover enclosing said motor stator to form a magnetic shield enclosing the magnetic flux of the motor, thereby reducing the generation of eddy currents in other portions of the apparatus, means rotatably supporting said second cylindrical member for independent rotation about the common axis of said cylindrical members while accurately maintaining the coaxial nested relation thereof, resilient means biasing said second member to a reference angular position, and indicating means connected to said second member for indicating angular displacements thereof from said reference position.

5. A vacuum gage for measuring the pressure in a vacuum system, comprising a vacuum-tight ferromagnetic metal case having an opening suitable for connection to a vacuum system, first and second hollow cylindrical members positioned within said case in coaxial nested relation, the spacing between major portions of the sides of said cylindrical members being about one-eighth inch, a shaft attached to said first cylindrical member and coaxial therewith, a nonmagnetic metal tube surrounding said shaft and extending through one end of said case, means closing the outer end of said tube to keep the case vacuum tight, bearings rotatably supporting said shaft within said tube, a magnetic rotor attached to said shaft within the portion of said tube outside the case, an electric motor stator about the outside of said tube adjacent to said rotor, whereby said stator, when energized, rotates said rotor, said shaft, and said first cylindrical member about the common axis of said cylindrical members, a ferromagnetic metal cover enclosing said motor stator to form a magnetic shield enclosing the magnetic flux of the motor, thereby reducing the generation of eddy currents in other portions of the apparatus, a transverse member within said vacuum-tight case, a pair of bearing recesses supported by said transverse member facing in opposite directions along the common axis of said cylindrical members, a yoke having tines with pivots thereon rotatably supported by said bearings, said second cylindrical member being attached to and supported by said yoke so that said second member is maintained in accurate coaxial nested relation with said first member and is rotatable independently thereof, resilient spring means biasing said second member to a reference angular position, a scale attached to said case, a pointer attached to said yoke and positioned in cooperative relation with said scale to indicate angular displacements of said second member from said reference position, a metal vane attached to said second member and rotatable therewith, the plane of said vane being perpendicular to its axis of rotation, and a magnet positioned so that said vane extends into and intercepts the magnetic field thereof, thereby providing magnetic damping resistance to rotation of said second member.

6. A vacuum gage for measuring the pressure in a vacuum system, comprising a vacuum-tight case having an opening suitable for connection to a vacuum system, first and second independently rotatable members within said case, one of said rotatable members comprising inner and outer coaxial cylinders, one within the other, the other of said rotatable members comprising an intermediate hollow cylinder positioned in coaxial nested relation between said inner and outer cylinders, means to rotate said first rotatable member about the common axis of said rotatable members, resilient means biasing said second rotatable member to a reference angular position, and indicating means connected to said second member for indicating angular displacements thereof from said reference position.

7. A vacuum gage for measuring the pressure in a vacuum system, comprising a vacuum-tight case having an opening suitable for connection to a vacuum system, first and second independently rotatable members within said case, said first rotatable member comprising inner and outer coaxial cylinders, one within the other, said second rotatable member comprising an intermediate hollow cylinder positioned in coaxial nested relation between said inner and outer cylinders, the spacing between said inner and intermediate cylinders and the spacing between said intermediate and outer cylinders each being not greater than the mean free path of gas molecules at the highest pressure to be measured, separate bearing means supporting said rotatable members in accurate coaxial nested relation, means to rotate said first rotatable member, resilient means biasing said second rotatable member to a reference angular position, and indicating means connected to said second member for indicating angular displacements thereof from said reference position.

8. A vacuum gage for measuring the pressure in a vacuum system, comprising a vacuum-tight case having an opening suitable for connection to a vacuum system, first and second independently rotatable members within said case, one of said rotatable members comprising inner and outer hollow coaxial cylinders, one within the other, the other of said rotatable members comprising an intermediate hollow cylinder positioned in coaxial nested relation between said inner and outer cylinders, means to rotate said first rotatable member about the common axis of said rotatable members, a yoke attached to said second rotatable member, means supporting said yoke for rotation about the common axis of said first and second members, said last-named means including a pair of bearings rotatably supporting the tines of said yoke, whereby said second member is maintained in accurate coaxial relation with said first member and is rotatable independently thereof, resilient means biasing said second member to a reference angular position, and indicating means connected to said second member for indicating angular displacements thereof from said reference position.

9. A vacuum gage for measuring the pressure in a vacuum system, comprising a vacuum-tight case having an opening suitable for connection to a vacuum system, first and second independently rotatable members within said case, one of said rotatable members comprising inner and outer hollow coaxial cylinders, one within the other, the other of said rotatable members comprising an intermediate hollow cylinder positioned in coaxial nested relation between said inner and outer cylinders, means to rotate said first rotatable member about the common axis of said rotatable members, resilient means biasing said second rotatable member to a reference angular position, indicating means connected to said second member for indicating angular displacements thereof from said reference position, a magnet, and an electrically conductive member attached to said second member and rotatable therewith, said electrically conductive member extending transversely into the field of said magnet, thereby providing magnetic damping resistance to rotation of said second member.

10. A vacuum gage for measuring the pressure in a vacuum system, comprising a vacuum-tight ferromagnetic metal case having an opening suitable for connection to a vacuum system, first and second independently rotatable members within said case, said first rotatable member comprising inner and outer hollow coaxial cylinders, one within the other, said second rotatable member comprising an intermediate hollow cylinder positioned in coaxial nested relation between said inner and outer cylinders, the spacing between said inner and intermediate cylinders and the spacing between said intermediate and outer cylinders each being not greater than the mean free path of gas molecules at the highest pressure to be measured, a shaft attached to said first cylindrical member and coaxial therewith, a nonmagnetic metal tube surrounding said shaft and extending through one end of said case, means closing the outer end of said tube to keep the case vacuum tight, bearings rotatably supporting said shaft within said tube, a magnetic rotor attached to said shaft within the portion of said tube outside the case, an electric motor stator about the outside of said tube adjacent to said rotor, whereby said stator, when energized, rotates said rotor, said shaft, and said first rotatable member about the common axis of said coaxial cylinders, a ferromagnetic metal cover enclosing said motor stator to form a magnetic shield enclosing the magnetic flux of the motor, thereby reducing the generation of eddy currents in other portions of the apparatus, a transverse member within said vacuum-tight case, a pair of bearing recesses supported by said transverse member facing in opposite directions along the common axis of said coaxial cylinders, a yoke having tines with pivots thereon rotatably supported by said bearing recesses, said second rotatable member being attached to and supported by said yoke so that said second member is maintained in accurate coaxial nested relation with said first member and is rotatable independently thereof, resilient spring means biasing said second member to a reference angular position, a scale attached to said case, a pointer attached to said yoke and positioned in cooperative relation with said scale to indicate angular displacements of said second member from said reference position, a metal vane attached to said second member and rotatable therewith, the plane of said vane being perpendicular to its axis of rotation, and a magnet positioned so that said vane extends into and intercepts the magnetic field thereof, thereby providing magnetic damping resistance to rotation of said second member.

11. A vacuum gage for measuring the pressure in a vacuum system, comprising a vacuum-tight case having an opening suitable for connection to a vacuum system, first and second hollow cylindrical members positioned within said case in coaxial nested relation, the spacing between major portions of the sides of said cylindrical members being about one-eighth inch, each of said cylindrical members having a plurality of louvres disposed about the circumference thereof, means to rotate said first cylindrical member about the common axis of said cylindrical members, means supporting said second cylindrical member for independent rotation about the common axis of said cylindrical members, resilient means biasing said second cylindrical member to a reference angular position, and indicating means connected to said second cylindrical member for indicating angular displacements thereof from said reference position.

12. A vacuum gage for measuring the pressure in a vacuum system, comprising a vacuum-tight metal case having an opening suitable for connection to a vacuum system, first and second hollow cylindrical members positioned within said case in coaxial nested relation, the spacing between major portions of the sides of said cylindrical members being about one-eighth inch, each of said cylindrical members having a plurality of louvres disposed at equal intervals about the circumference thereof, said louvres occupying a relatively small portion of the cylindrical surfaces, a shaft attached to said first cylindrical member and coaxial therewith, a nonmagnetic metal tube surrounding said shaft and extending through one end of said case, means closing the outer end of said tube to keep the case vacuum tight, bearings rotatably supporting said shaft within said tube, a magnetic rotor attached to said shaft within the portion of said tube outside the case, an electric motor stator about the outside of said tube adjacent to said rotor, whereby said stator, when energized, rotates said rotor, said shaft, and said first cylindrical member about the common axis of said cylindrical members, a ferromagnetic metal cover enclosing said motor stator to form a magnetic shield enclosing the magnetic flux of the motor, thereby reducing the generation of eddy currents in other portions of the apparatus, a transverse member within said vacuum-tight case, a pair of bearing recesses supported by said transverse member facing in opposite directions along the common axis of said cylindrical members, a yoke having tines with pivots thereon rotatably supported by said bearing recesses, said second cylindrical member being attached to and supported by said yoke so that said second member is maintained in accurate coaxial nested relation with said first member and is rotatable independently thereof, resilient spring means biasing said second member to a reference angular position, a scale attached to said case, a pointer attached to said yoke and positioned in cooperative relation with said scale to indicate angular displacements of said second member from said reference position, a metal vane attached to said second member and rotatable therewith, the plane of said vane being perpendicular to its axis of rotation, and a magnet positioned so that said vane extends transversely into and intercepts the magnetic field thereof, thereby providing magnetic damping resistance to rotation of said second member.

JOHN A. ROBERTS.

References Cited in the file of this patent

UNITED STATES PATENTS

| Number | Name | Date |
|---|---|---|
| 1,126,233 | Langmuir | Jan. 26, 1915 |
| 2,092,640 | Dallmann | Sept. 7, 1937 |
| 2,353,617 | Lamb | July 11, 1944 |
| 2,472,609 | Moore, Jr. | June 7, 1949 |

FOREIGN PATENTS

| Number | Country | Date |
|---|---|---|
| 383,283 | Germany | Oct. 12, 1923 |
| 642,268 | France | May 5, 1928 |

OTHER REFERENCES

Timiriazeff (article), Annalen der Physik; volume 345, 1913, No. 5 pages 971–991.